United States Patent [19]

Yokokawa

[11] 3,812,883
[45] May 28, 1974

[54] MECHANISM FOR PREVENTING THE STICKING OF SPOOL VALVES

[75] Inventor: Takio Yokokawa, Takarazuka, Japan

[73] Assignee: Sumitomo Precision Products Company Limited, Hyogo Prefecture, Japan

[22] Filed: Apr. 5, 1972

[21] Appl. No.: 241,469

Related U.S. Application Data

[63] Continuation of Ser. No. 881,997, Dec. 4, 1969, abandoned.

[30] Foreign Application Priority Data

Dec. 28, 1968  Japan.................................. 43-1054

[52] U.S. Cl............. 137/625.69, 251/324, 251/256, 308/9
[51] Int. Cl............................................ F16k 11/07
[58] Field of Search .......... 251/356, 366, 367, 324, 251/368, 325, 137, 129; 137/625.63, 625.64, 625.65, 625.69, 596.17, 625.48; 308/9

[56] References Cited
UNITED STATES PATENTS

| 1,288,811 | 12/1918 | Birrell............................... 251/356 |
| 1,363,248 | 12/1920 | Gritzner............................. 251/356 |
| 2,646,815 | 7/1953 | Leventhal...................... 251/367 X |
| 2,879,788 | 3/1959 | Beckett et al.................. 251/367 X |
| 3,303,831 | 2/1967 | Sherman........................ 137/538 X |
| 3,393,702 | 7/1968 | Ferrill............................. 137/540 X |

Primary Examiner—Henry T. Klinksiek
Attorney, Agent, or Firm—Watson, Cole, Grindle and Watson

[57]       ABSTRACT

This invention is to make many annular grooves with a very narrow land width on the outer peripheral surface of the land of spool or on the inner peripheral surface of the spool hole of a valve body.

1 Claim, 6 Drawing Figures

MECHANISM FOR PREVENTING THE STICKING OF SPOOL VALVES

This is a continuation of Ser. No. 881,997, filed 12-4-69, now abandoned.

This invention relates to a mechanism for preventing the sticking of spool valves.

When a spool valve is used in an oil pressure circuit, due to a force in the direction at right angles with the axis by the nonuniformity of the pressure in the peripheral direction of the oil in the clearance between the spool and valve body, a kind of static frictional force increases with the time, the operation of the spool becomes difficult and a phenomenon that the spool valve does not move at all, that is, a so-called hydraulic lock has become a great problem.

There are already methods of preventing such hydraulic lock wherein the operating oil is kept clean in order to elevate the working precision, the land of the spool is tapered or stepped or grooves are made on the land of the spool and wherein the spool is always rotated or vibrated. In the former method by the working precision, tapering or grooving, the sticking preventing effect can not be well obtained due to the dust in the oil and under the high pressure and therefore a fine filter or the like has been used. In the latter method, there have been defects that the structure is complicated and that the entire valve becomes large and costly. Today generally the former sticking preventing method is used. However, as described above, its effect is not sufficient. Therefore, its use under a high pressure or for a long switching time is restricted without any sufficient effect.

A object of the present invention is to provide a mechanism for preventing the sticking of spool valves by finely dividing grooves in the land part of the spool so that there may be no hydraulic lock.

Figure 1:
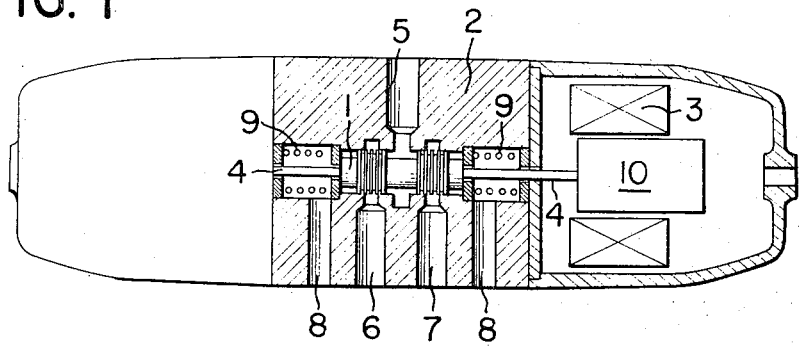
FIG. 1 is a vertical sectional view of a solenoid operated valve provided with a mechanism of the present invention with a part removed.

According to the present invention, in a solenoid operated valve in which a valve spring 9 is provided at each end of a spool 1 provided in a valve body 2 so that the spool 1 may keep a neutral position and a push rod 4 in contact with a movable iron core 10 of a solenoid 3 at each end of the valve is connected to each end of the spool, there are made many annular grooves 12 with a land width of less than 0.5mm on the spool 1 or many annular grooves 13 with a land width of less than 0.5mm on the inner peripheral surface of the spool hole of the valve body 2. In the drawings, 5 is a pressure port, 6 and 7 are outlet ports and 8 is a discharging port.

Figure 2:
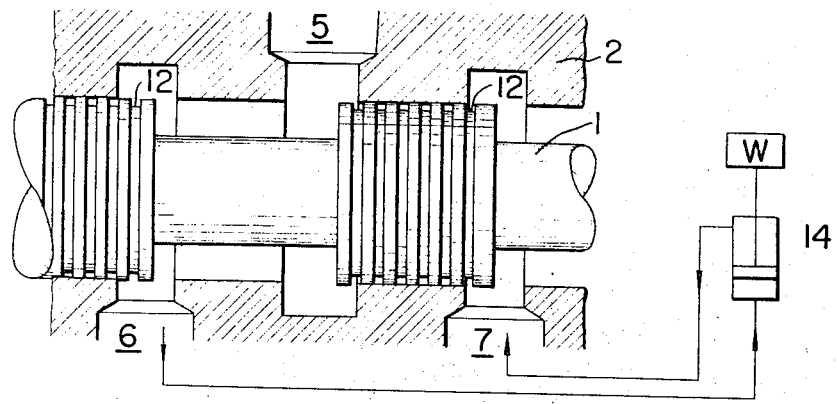
FIG. 2 is an explanatory view showing the operation of the spool in FIG. 1.

Now, when the solenoid 3 is energized, the movable iron core 10 is attracted and the push rod 4 moves inward. Therefore, the spool 1 is pushed to move leftward from the neutral state so as to be in the state in FIG. 2. At this time, a pressure oil is fed to a cylinder 14 through the outlet port 6 from the pressure port 5. The oil returning from the cylinder 14 returns to a tank from the discharging port 8 through the outlet port 7. When the solenoid 3 is then de-energized, due to the spring 9, the spool returns to the neutral state shown in FIG. 1.

Figure 3:
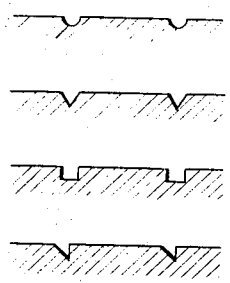
FIG. 3 is an enlarged vertical sectional view showing various grooves made on the lands of conventional spools.

With such conventional spool in which the minimum land width of the grooves made in the land part of the spool is about 0.8mm as in shown in FIG. 3, under a high pressure, in a few minutes of the energizing time, a hydraulic lock occurs and the operation of the valve becomes abnormal. With a spool in which the land width of the groove 12 is more than 0.8mm as in the conventional example, even if the land width is changed, the hydraulic lock is not always solved and therefore it has not been clarified that there is an intimate relation between the hydraulic lock and the land width of the groove.

Figure 4:
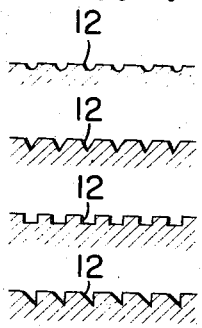
FIG. 4 is an enlarged vertical sectional view showing various finely divided grooves made on the lands of spools according to the present invention.
Figure 5:
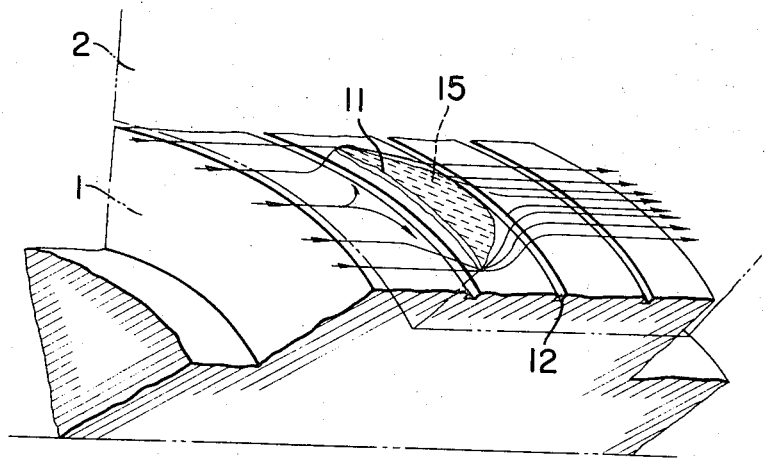
FIG. 5 is an explanatory view showing dust as deposited when a spool has stuck.
Figure 6:
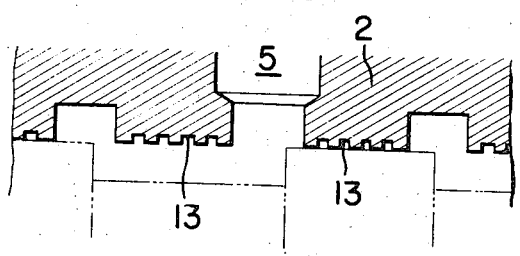
FIG. 6 is an enlarged vertical sectional view of a part of a valve body in case finely divided grooves are made on the inside surface of the valve body.

As shown in FIG. 5, when dust 11 is deposited on the peripheral surface of the spool 1, the streams of oil which have been flowing in parallel with the axis make such streamlines as are shown by the arrows and produce a low pressure zone 15 in the rear of the dust 11. Therefore, the spool is pressed to stick to the valve body 2 by a force corresponding to the low pressure zone. It requires further researches to conclude that a hydraulic lock is caused only by the above reason. However, on such assumption as in the above, it is considered that, in order to solve the hydraulic lock, the low pressure zone may be eliminated by increasing the grooves to be made in the land part. Thus, such spool in which the land is finely divided as in FIG. 4 has been invented and has been tested by varying the land width of the groove. As a result, it has been confirmed that, in such conventional spool in which the land width is more than 0.8 mm, a sticking phenomenon appears remarkably but that, as the land width is made narrower, the sticking phenomenon becomes weaker quickly and that, with a spool of a land width of less than 0.5mm., even in case a high pressure fluid is used, the sticking phenomenon can be prevented substantially perfectly. Further, as a result of the tests made by varying the shape of the groove 12 as shown in FIG. 4, it has been found that the shape and depth of the groove have essentially nothing to do with the sticking phenomenon. Further, even if grooves 13 are made on the inner peripheral surface of the spool hole of the valve body 2 as shown in FIG. 6 instead of making the finely divided grooves in the land part of the spool 1, the same operation and effect are obtained.

As described above, the present invention is only to increase the number of grooves in the spool land part but has clarified the relation between the hydraulic lock and the land width in the land part of the spool. As a result, by finely dividing the land width of a spool to be a fraction of that of a conventional one, the pressure unbalance by dust can be minimized, the sticking of the spool can be well prevented and thereby the range of use of a solenoid operated valve in which the hydraulic lock has not been able to be solved under a high pressure can be remarkably expanded. It is needless to say that the present invention can be applied not only to switching valves but also as it is to general oil pressure valves.

What is claimed is:

1. A spool valve disposed within the oil laden bore of a valve body for sliding movement along the longitudinal axis of the valve, characterized by a plurality of annular grooves provided along the outer periphery of the spool valve, the land width between adjacent ones of said grooves being less than 0.5 mm whereby any sticking between the spool valve and the bore of said valve body is substantially avoided.

* * * * *